United States Patent
Dulepet et al.

(10) Patent No.: US 7,316,003 B1
(45) Date of Patent: Jan. 1, 2008

(54) SYSTEM AND METHOD FOR DEVELOPING A DYNAMIC WEB PAGE

(75) Inventors: Sanjay Dulepet, Cupertino, CA (US); Stephen Tom, Mountain View, CA (US); Srinivasan T. Raman, Hayward, CA (US); Predrag Petkovic, San Francisco, CA (US)

(73) Assignee: Oracle International Corp., Redwood Shores, CA (US)

( * ) Notice: Subject to any disclaimer, the term of this patent is extended or adjusted under 35 U.S.C. 154(b) by 489 days.

(21) Appl. No.: 10/322,898

(22) Filed: Dec. 18, 2002

(51) Int. Cl.
*G06F 9/44* (2006.01)

(52) U.S. Cl. ............... 717/111; 717/110; 717/113

(58) Field of Classification Search ........ 717/106–113; 705/501, 513
See application file for complete search history.

(56) References Cited

U.S. PATENT DOCUMENTS

| | | | | |
|---|---|---|---|---|
| 6,009,441 | A * | 12/1999 | Mathieu et al. .......... | 707/516 |
| 6,360,249 | B1 | 3/2002 | Courts et al. | |
| 6,558,431 | B1 * | 5/2003 | Lynch et al. ............. | 715/513 |
| 6,715,129 | B1 * | 3/2004 | Hind et al. .............. | 715/513 |
| 6,889,359 | B1 * | 5/2005 | Conner et al. ............ | 715/509 |
| 6,938,205 | B1 * | 8/2005 | Hanson et al. ........... | 707/526 |
| 7,117,436 | B1 * | 10/2006 | O'Rourke et al. ......... | 715/517 |
| 2001/0047402 | A1 * | 11/2001 | Saimi et al. ............. | 709/219 |
| 2002/0147748 | A1 * | 10/2002 | Huang et al. ............ | 707/517 |
| 2003/0208530 | A1 * | 11/2003 | Bhogal et al. ........... | 709/203 |
| 2003/0226107 | A1 * | 12/2003 | Pelegri-Llopart et al. ... | 707/501 |
| 2003/0229677 | A1 * | 12/2003 | Allan .................. | 709/217 |
| 2003/0237046 | A1 * | 12/2003 | Parker et al. ............ | 707/500 |
| 2004/0090458 | A1 * | 5/2004 | Yu et al. ............... | 345/760 |

OTHER PUBLICATIONS

"DM News Service: Macromedia Introduces Dreamweaver UltraDev" May 2000 posted at http://caddea.hostcentric.com/cgi-bin/dm_news/db.cgi?db=default&uid=default&ww=on&ID=43&view_records=1 and downloaded on Dec. 4, 2006.*
Hallo gram; Dreamweaver Ultradev; 2000; Hallo gram Publishing.*

* cited by examiner

*Primary Examiner*—Meng-Al T. An
*Assistant Examiner*—Jason Mitchell
(74) *Attorney, Agent, or Firm*—Park, Vaughan & Fleming, LLP

(57) ABSTRACT

A system and method for developing a dynamic web page. An editor facilitates creation and modification of a web page created from static and dynamic web page code. The editor provides a source code view for accessing the dynamic code, static code and static content corresponding to the static code. The editor also provides a visual editor for accessing dynamic content generated from corresponding dynamic code. Modifications to code or content in one view are reflected in the other. A controller generates a merged model of the code and content of the web page. The merged model may be in the form of a hierarchical ordering of nodes, wherein each node corresponds to a code element or a content element. A pre-processor marks dynamic code before the code is deployed, and a post-processor un-marks the dynamic code.

20 Claims, 7 Drawing Sheets

```
401  <%@ page content Type="text/html;"%>
402  <HTML>
       <HEAD>
         <TITLE>
           SAMPLE TITLE
         </TITLE>
       </HEAD>
       <BODY>
         <P>
         THE DATE IS:
         <I> SEE DATE BELOW </I>
         </P>
403      <%out.println("<B>"+new java.util.Date());+"</B>"%>
       </BODY>
     </HTML>
```

FIG. 4A

```
<HTML>
  <HEAD>
    <TITLE>
      SAMPLE TITLE
    </TITLE>
  </HEAD>
  <BODY>
    <P>
    THE DATE IS:
    <I> SEE DATE BELOW </I>
    </P>
404 <B>Fri Nov 15 2:25:26 EST 2002</B>
  </BODY>
</HTML>
```

FIG. 4B

```
THE DATE IS: SEE DATE BELOW
Fri Nov 15 2:25:26 EST 2002
```

FIG. 4C

SYSTEM AND METHOD FOR DEVELOPING A DYNAMIC WEB PAGE

BACKGROUND

This invention relates generally to the field of computer systems. More particularly, a system and methods are provided for developing a web page that comprises dynamically generated content.

A typical web page comprises static content formatted according to a browser-interpretable markup language, such as Hypertext Markup Language (HTML). This type of page can be effective for 'one-way' publishing of material that changes infrequently.

Increasingly, however, the World Wide Web is transforming into a two-way environment in which dynamic web pages may behave similarly to interactive standalone applications (e.g., a spreadsheet, a personal database). In particular, a dynamic web page may be used to deliver time-sensitive or personalized page content to a user's browser.

Often, a dynamic web page will vary the content it delivers based upon any number of variables, including information provided by a browser user, the identity or geographic location of a user, selections made by a user while viewing a web page, etc. For example, a weather-related web page may dynamically generate a localized weather forecast based upon a user's zip code, or a travel-related web page may dynamically display, in a user's browser, a listing of available seats on a user-selected airline flight.

Dynamic content for display within a dynamic web page may be generated by a web application server in response to a user request. A web application server may be an application server configured to implement the JavaServer Pages™ (JSP™) specification. A dynamic web page (e.g., a JSP page) may have a high degree of complexity and therefore may be difficult and time-consuming for a web page developer to create, edit and/or maintain.

A typical JSP page comprises standard web page markup language code (e.g., static HTML), often called template text, interleaved with special JSP elements for generating the dynamic parts of a page that may differ from one page request to another. JSP elements characteristically comprise scripting elements such as Java™ scriplets or Perl scripts directing a server to insert dynamically generated content at a specified location in the page. JSP scripting elements, similar to elements in many Standard General Markup Languages (SGML), are typically surrounded by pairs of angle brackets and 'percent' symbols (e.g., <% . . . %>) the combination of which forms a JSP tag.

JSP elements may also comprise directive elements specifying information about a JSP page that remains the same between page requests, such as the scripting language used in the page (e.g., JavaScript, Perl, VBScript), the name of the page, etc. JSP elements may further comprise action elements, which typically perform actions such as retrieving time-sensitive data from a database.

Generally, a browser client submits a JSP page to a JSP enabled web or application server. The server executes the JSP scripting elements within the page, by generating dynamic page content (e.g., HTML) corresponding to the JSP scripting elements and replacing each JSP scripting element with the corresponding dynamically generated content. Thus, the server merges the dynamically generated content with the static code or content of the page before returning the dynamically composed page to the requesting browser.

A JSP enabled server may also execute JSP elements in a JSP page that do not generate content (e.g., directive elements, action elements). Such elements may declare variables, or facilitate decision flow control (e.g., if statement, switch statement) for executing dynamic code. The JSP server may replace these JSP elements with a null or empty text string in the dynamically composed page.

When executing a JSP element, a JSP enabled server may retrieve content from a database and/or enforce logic rules when fulfilling the corresponding JSP page request.

Often, custom functionality common to multiple dynamic web pages, such as accessing a database, processing a web page form, or other recurring tasks, may be added to a JSP enabled server and/or a JSP page. Such functionality may be added by pre-defined reusable modules called tag libraries.

To help a web page developer create, edit and/or maintain a web page, a web page authoring tool may be used. Currently available web page authoring tools include intuitive what-you-see-is-what-you-get (WYSIWYG) interactive visual tools, graphical user interfaces (GUI's), and integrated development environments (IDEs). These tools may facilitate direct manipulation of static web page content, but generally do not provide similar assistance during the creation and editing of dynamically generated page content.

Generally, a visual WYSIWYG-based web page editing tool does not identify, create, or maintain associations or relationships between page content elements displayed in the editor, dynamic source code elements (e.g., JSP elements) underlying the displayed content elements, and corresponding page content dynamically generated by a JSP-enabled server. Therefore, when developing a web page comprising dynamic content, a page developer must often create or edit web source code using a text-based editor or source code type editor.

Unfortunately, when developing a dynamic web page, a text-based editing tool may require a developer to be intimately familiar with the language structure, syntax and formatting rules of several web page languages and technologies (e.g., HTML, Java, JSP). Further, in order to view changes made to the source code, a developer may be required to manually spawn a browser or similar viewer.

Because text-based web page editing tools can be cumbersome to use, and do not allow a developer to directly manipulate or view dynamically generated page content in a WYSIWYG view as a web page is being created or edited, there is a need in the art for a system and method for developing a web page comprising dynamically generated content. There is also a need for a system and method for maintaining and continually updating an in-memory representation, or model, of a dynamic web page.

SUMMARY

In one embodiment of the invention, a system and methods are provided for developing (e.g., creating, editing, and/or manipulating) a dynamic web page comprising dynamically generated content (e.g., dynamically generated HTML). The dynamic web page may also comprise static source code for displaying static web page content (e.g., HTML), dynamic source code for generating dynamically generated web page content (e.g., Java scriptlets), and static web page content (e.g., static text paragraphs, static text headings).

An editor for developing a dynamic web page, executing on a developer workstation, may comprise a visual editor view of the web page, a source code editor view of the web page, and a controller to facilitate creating and maintaining a merged model representation of the web page. The editor views may provide interfaces for viewing, creating, and editing the dynamic web page and the corresponding merged model representation of the web page.

The visual editor view may comprise a WYSIWYG tool facilitating the creation, viewing and editing of static web page content and/or dynamically generated web page content. The visual editor view may display a visual representation of the dynamic web page that is essentially similar to a visual representation of the dynamic web page, as it would be displayed in a typical web browser.

The source code editor view may comprise a text-based editing tool for facilitating the creation, viewing, and editing of static source code and/or dynamic source code.

In an embodiment of the invention, a merged model representation of a dynamic web page may comprise an ordered representation of the static source code, static content, dynamic source code, and dynamically generated content of the web page. Further, the merged model may indicate one or more associations or relationships between dynamic source code and corresponding dynamically generated content.

The controller, in response to a change made by a page developer to an editor view of the dynamic web page, may update the merged model representation of the dynamic web page to include the content and/or source code change. Further, the controller may synchronize or update either, or both, of the editor views of the merged model.

In this embodiment, the controller may deploy web page source code to a server configured to replace dynamic code (within the deployed web page source code) with dynamically generated content according to the Java Server Pages (JSP) specification. A JSP container or web container, executing on the server, may convert, compile and/or execute the deployed dynamic source code via an executable Java servlet configured to generate requested dynamic content. The JSP container may retrieve data from a database to satisfy the dynamic content request(s) within the deployed web page source code.

In another embodiment of the invention, an editor, essentially similar to the editor of the above embodiment, executing on a stand-alone computer system, such as a developer workstation or personal computer, may comprise a design time engine. In response to a controller-deployed dynamic page request, the design time engine may be configured to replace dynamic code (e.g., a JSP element), within deployed web page source code, with a design time component.

In this embodiment of the invention, a design time component may comprise a content placeholder (e.g., icon, empty table) representative of content that would have been generated by a JSP container if the controller had deployed the dynamic code element to an executing JSP container.

DESCRIPTION OF THE FIGURES

FIG. 4A is a sample dynamic web page source code listing.

FIG. 4B depicts dynamically generated web page source code corresponding to the listing of FIG. 4A.

FIG. 4C depicts dynamically generated web page content corresponding to the source code of FIG. 4B, as it may be rendered in a typical browser.

DETAILED DESCRIPTION

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

The program environment in which a present embodiment of the invention is executed illustratively incorporates a general-purpose computer or a special purpose device such as a hand-held computer. Details of such devices (e.g., processor, memory, data storage, display) may be omitted for the sake of clarity.

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM) and/or non-volatile (e.g., ROM, disk) memory, carrier waves and transmission media (e.g., copper wire, coaxial cable, fiber optic media). Exemplary carrier waves may take the form of electrical, electromagnetic or optical signals conveying digital data streams along a local network, a publicly accessible network such as the Internet or some other communication link.

In embodiments of the invention described herein, systems and methods are provided for developing a web page comprising dynamically generated content.

In an embodiment of the invention, an editor, executing on a computer system, maintains and manipulates an ordered electronic representation of a dynamic web page within a memory in the computer system. The in-memory representation, or merged model, of the dynamic web page may comprise any or all of the following: static web source code, static web page content, dynamic web source code and dynamically generated web page content. The merged model may indicate one or more associations or links between each piece of dynamic web source code, and its corresponding dynamically generated content.

Figure 1:
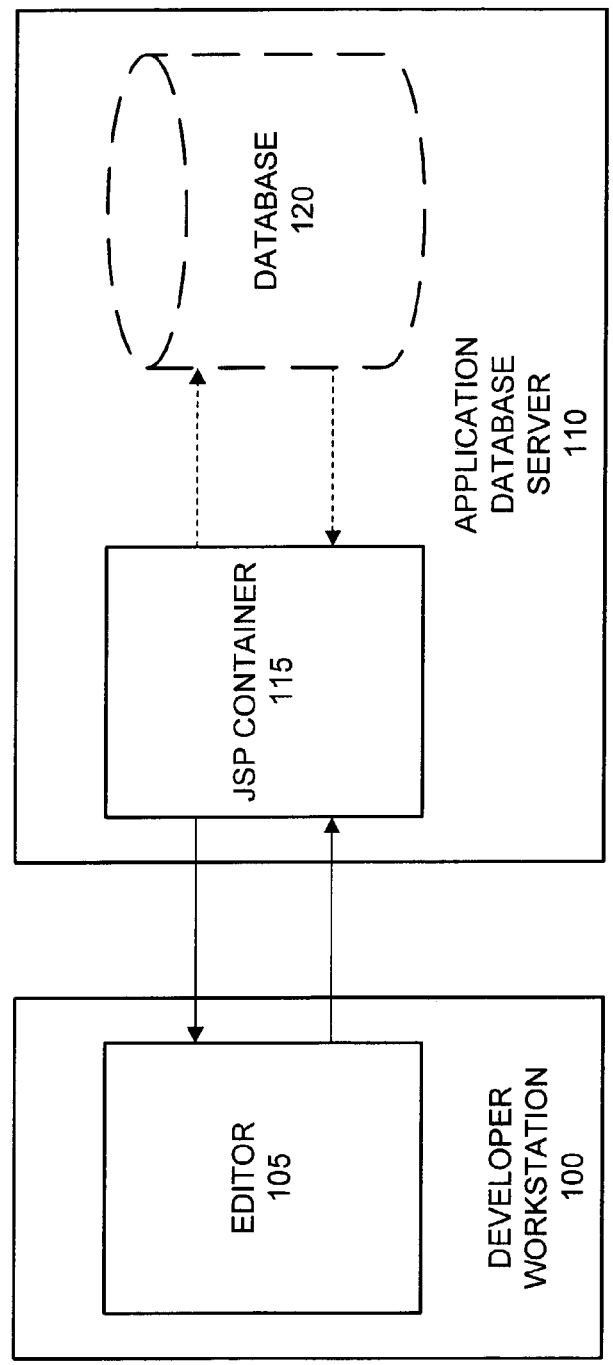
FIG. 1 depicts a system in which a web page comprising dynamically generated content may be developed, in accordance with an embodiment of the present invention.

FIG. 1 depicts a system in which a web page comprising dynamically generated content may be developed, in accordance with one embodiment of the invention. In this embodiment of the invention, the system comprises developer workstation 100, editor 105, application database server 110, JSP (Java Server Pages) container 115, and optional database 120.

Developer workstation 100 is a computer system communicating with application database server 110 via a direct or indirect (e.g., network) connection over a wired or wireless communication link, such as the Internet. Workstation 100 may be any type of computer system (e.g., personal computer, workstation, laptop, handheld).

In the embodiment of FIG. 1, editor 105 is a software tool for creating, viewing and editing a web page comprising dynamically generated content. In this embodiment of the invention, editor 105 is configured to deploy web page source code, comprising static code and/or dynamic code (i.e., code for generating dynamic content), to JSP container 115.

JSP container 115 and database 120 reside in application database server 110. JSP container 115 is configured to receive web page source code from editor 105, and convert, compile, and/or execute dynamic web page source code elements within received source code.

JSP container 115, when executing dynamic source code, may replace dynamic source code within the received source code with corresponding dynamically generated web page content. JSP container 115 may then return the dynamically generated web page to editor 105.

Database 120 is configured to receive data requests from JSP container 115, and in response to the requests, return requested data to JSP container 115. Dynamically generated page content, or other data returned to editor 105 by JSP container 115, may therefore include data retrieved from database 120. However, JSP container 115 may not retrieve data from database 120 for every executed dynamic source code element within the received source code.

In this embodiment of the invention, JSP container 115 and database 120 are co-located in application database server 110; however, in another embodiment of the invention, JSP container 115 and database 120 may be distributed across multiple computer systems, and either component may comprise the other.

Figure 2:
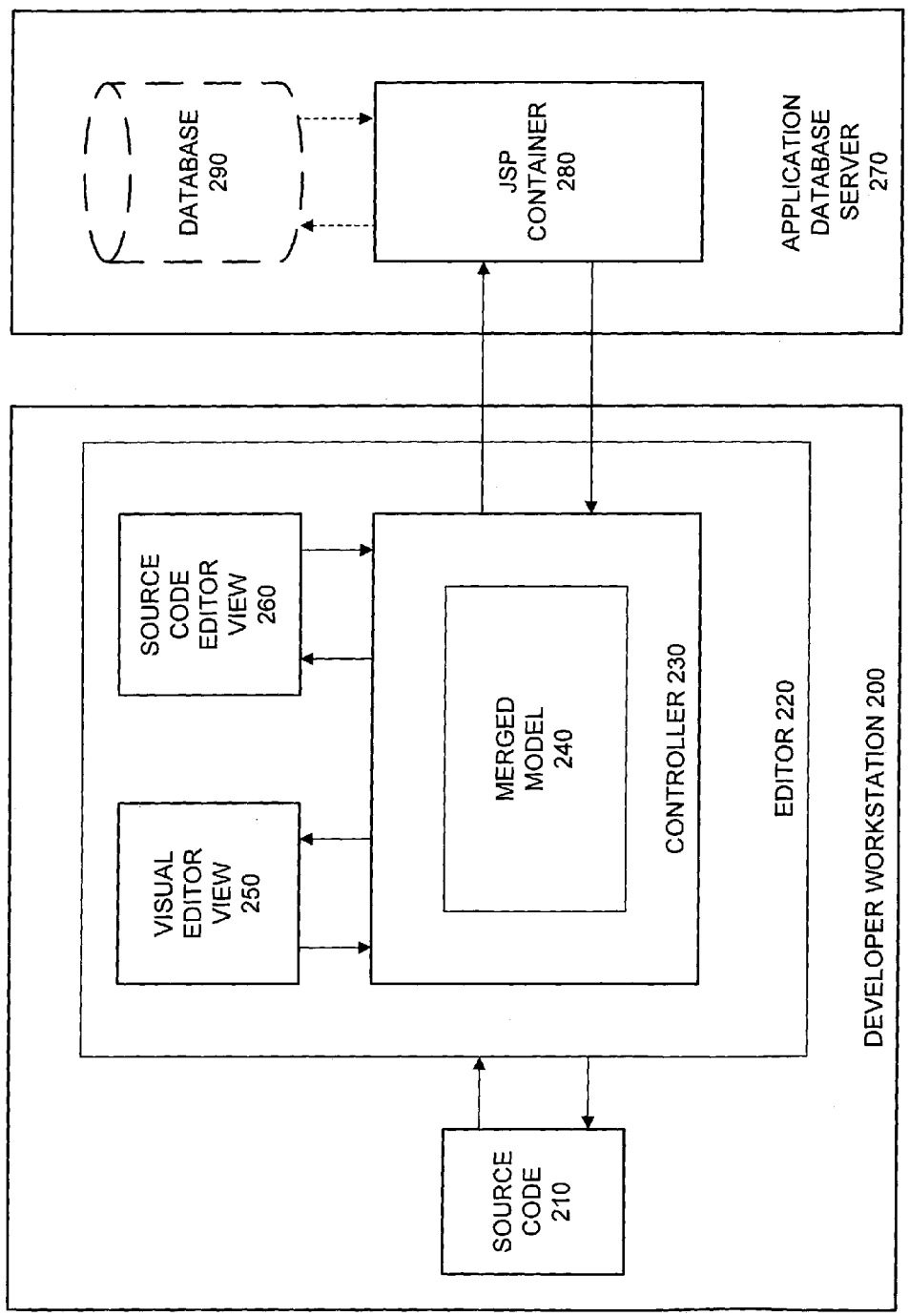
FIG. 2 depicts an editor for facilitating development of a web page comprising dynamically generated content, in accordance with an embodiment of the invention.

FIG. 2 depicts an editor for facilitating development of a web page comprising dynamically generated content, in accordance with one embodiment of the invention.

In this embodiment of the invention, editor 220 executes on developer workstation 200. Editor 220 comprises controller 230, merged model 240, visual editor view 250, and source code editor view 260. Source code 210 may comprise static web page source code, static web page content, and dynamic web page source code. Editor 220 may retrieve and/or store source code 210 in a volatile memory (e.g., RAM) or non-volatile storage device (e.g., a magnetic disk drive) in developer workstation 200.

One or more components of this embodiment may be configured similarly and/or may operate similarly to corresponding system components of the embodiment of the invention depicted in FIG. 1.

Visual editor view 250 and source code editor view 260 provide interactive design surfaces for creating, viewing and/or editing a dynamic web page.

Illustratively, visual editor view 250 may comprise a visual, interactive, 'what-you-see-is-what-you-get' (WYSI-WYG) editor that permits a page developer, within a single editor view, to modify web page content and subsequently view the content of a web page as it would be displayed in a typical web browser.

Visual editor view 250 may permit a page developer to place into a page pre-designed web page content, including dynamically generated content and/or page controls. For example, a page developer may want the current, dynamically generated date to appear in the web page. Therefore, the developer may place a pre-designed piece of web page content, such as a 'date control,' chosen from a palette of pre-designed page content controls or tools, into visual editor view 250. The date control may be associated with corresponding dynamic source code necessary for a JSP container to dynamically generate the date.

Source code editor view 260 may comprise a text-based editor that permits a page developer to view, create and/or edit web page source code. The source code may comprise static web page source code, static page content, and/or dynamic web page source code. Similar to the above example to place the current date in a web page, a page developer may enter into source code editor view 260 a line of dynamic web source code for generating the current date (e.g., a JSP executable Java 'date scriptlet').

In this embodiment of the invention, a page developer may create or modify a dynamic web page in visual editor view 250 and/or source code editor view 260. Another embodiment of the invention may provide other editor views, such as a site editor view for editing several dynamic web pages simultaneously, a table editor view for detail editing of a portion of a dynamic web page comprising a table, etc.

In the illustrated embodiment of the invention, controller 230 communicates with visual editor view 250 and source code editor view 260. Controller 230 also communicates with JSP container 280.

JSP container 280, executing in application database server 270, is configured to receive, from controller 230, web page source code for a dynamic web page. Upon receiving the source code, JSP container 280 may replace dynamic source code elements within the source code with dynamically generated page content, and return a dynamically generated web page to controller 230.

Furthering the 'date' example above, JSP container 280, after receiving deployed web page source code from controller 230, may convert, translate and/or execute the dynamic source code element for generating the current date (e.g., 'new java.util.Date( )' scriptlet). Thus, JSP container 280 replaces the dynamic code with the current date (e.g., 'Fri Dec 13 2:25:26 EST 2002').

When replacing dynamic source code elements, JSP container 280 may convert a dynamic source code element within the source code into a Java servlet, and compile and/or execute the servlet, to dynamically generate the page to be returned to controller 230. In this embodiment of the invention, template text source code, such as static HTML and static text, passes through JSP container 280 without modification.

In this embodiment of the invention, controller 230 deploys web page source code to a single JSP container. In another embodiment of the invention, controller 230 may deploy web page source code and/or Java servlets to multiple JSP containers, or a first JSP container may deploy source code and/or servlets to a second JSP container.

Database 290, also executing in application database server 270, is configured to accept data requests from JSP container 280, and in response to the requests, return requested data to JSP container 280. When processing deployed web page source code, JSP container 280 may replace dynamic code with data retrieved from database 290. In the illustrated embodiment, database 290 is an Oracle® relational database management system (RDBMS) by Oracle Corporation of Redwood Shores, Calif.

In one embodiment of the invention, JSP container 280 generates dynamic content according to a server-side scripting specification defined by the Java Server Pages (JSP) specification. In another embodiment of the invention, a different server-side scripting specification may be implemented on application database server 270 in place of JSP container 280, such as Active Server Pages (ASP) or PHP Hypertext Preprocessor (PHP).

Merged model 240 of FIG. 2 comprises an ordered memory model representation of static source code, static content, dynamic source code and/or dynamically generated content of a dynamic web page being developed on developer workstation 200.

Controller 230 facilitates the creation and maintenance of merged model 240. For example, controller 230 may synchronize merged model 240 with visual editor view 250, and/or source code editor view 260, as web page source code or web page content is modified, added or removed by a page developer in either editor view.

Controller 230 may also arrange dynamic source code, and its corresponding generated content, in merged model 240 to indicate one or more bi-directional links or associations between the dynamic source code and corresponding content dynamically generated by JSP container 280.

In this embodiment of the invention, controller 230 may receive a change notification, initiated by a page developer in visual editor view 250 or source code editor view 260, regarding a change to a dynamic web page. The change may involve the insertion of new dynamic content, or the modification or deletion of existing dynamic web page content in visual editor 250. Or, the change may involve insertion, modification or deletion of web page source code in source code editor view 260.

In response to the change notification, controller 230 may retrieve and/or examine web page source code from visual editor view 250 or source code editor view 260. Controller 230 may also mark dynamic source code elements underlying corresponding dynamic page content displayed in visual editor view 250, or dynamic source code elements displayed in source code editor view 260, before passing the source code to JSP container 280.

After receiving dynamically generated web page source code from JSP container 280, including any marked dynamically generated content, controller 230 updates merged model 240 and removes previously added source code marks. Further, controller 230 updates or refreshes visual editor view 250 to display web page content from updated merged model 240, and updates source code editor view 260 to display web page source code from updated merged model 240.

In this embodiment of the invention, controller 230 deploys (to JSP container 280) complete web page source code, corresponding to modified and unmodified web page content displayed in visual editor view 250. In another embodiment of the invention, controller 230 may deploy a subset of the complete web page source code, comprising only modified web page source code.

In the embodiment of the invention depicted in FIG. 2, editor 220 may retrieve or store source code 210 in a non-volatile storage device in developer workstation 200, such as a magnetic disk drive. In another embodiment of the invention, editor 220 may retrieve or store source code 210 in another type of non-volatile storage, such as an optical storage device, or may retrieve or store source code 210 from another storage location, such as a disk drive in a network file server.

Figure 3:
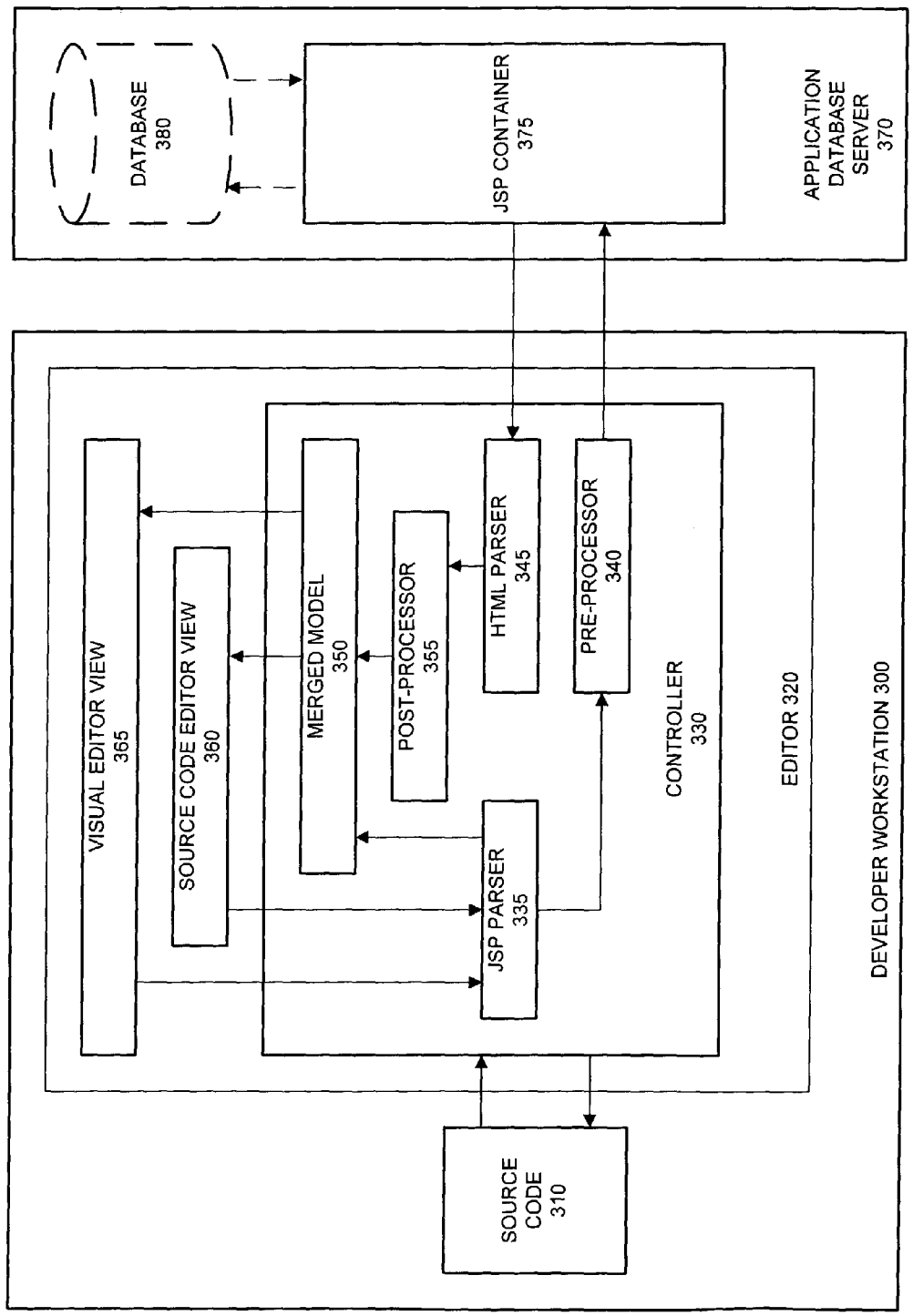
FIG. 3 is a block diagram illustrating a controller, in a system for facilitating development of a dynamic web page, in accordance with an embodiment of the invention.

FIG. 3 is a block diagram illustrating a controller, in a system for facilitating development of a dynamic web page, in accordance with an embodiment of the invention.

In this embodiment of the invention, the system comprises developer workstation 300, source code 310, editor 320, controller 330, source code editor view 360, visual editor view 365, application database server 370, JSP container 375, and database 380. One or more components of this embodiment may be configured similarly and/or may operate similarly to corresponding system components of the embodiment of the invention depicted in FIG. 2.

Editor 320 executes in developer workstation 300. Editor 320 comprises controller 330, source code editor view 360 and visual editor view 365. Controller 330 comprises JSP parser 335, pre-processor 340, HTML parser 345, merged model 350, and post-processor 355.

Controller 330, in response to a page developer request, may initialize a page editing session by retrieving source code 310 from a non-volatile storage device, such as a magnetic disk drive, in developer workstation 300, and loading it into source code editor view 360 and visual editor view 365. In this embodiment of the invention, source code 310 comprises web page source code for a dynamic web page. Initialization of the session may also include the retrieval of dynamic content (e.g., from a JSP container) and retrieval or construction of an initial merged model.

In this embodiment of the invention, JSP parser 335 of controller 330 may receive a notification (e.g., initiated by a page developer), of a change to a dynamic web page. In another embodiment of the invention, the change may be initiated from visual editor view 365, or some other editor view, such as an editor view comprising an entire web site. Illustratively, the change may involve the insertion, modification, or deletion of web page source code in source code editor view 360.

In response to receiving a change notification, JSP parser 335 may retrieve and examine web page source code (e.g., from source code editor 360), in order to identify dynamic source code statements in the retrieved web page source code (e.g., JSP scripting elements).

JSP parser 335 may also create or update a parse tree, an ordered hierarchical representation of the syntactic structure of the web page source code and/or content. Controller 330 may use the source code parse tree to facilitate updating or creating merged model 350. Further, JSP parser 335 may identify syntax errors, or other types of problems in the source code, and notify the page developer.

If JSP parser 335 does not identify or locate any dynamic source code elements in the examined code, controller 330 creates or updates merged model 350, and refreshes source code editor view 360 and visual editor view 365 to reflect the representation of the dynamic web page comprising updated merged model 350.

If JSP parser 335 detects one or more dynamic source code elements in the code it examines, the JSP parser forwards the web page source code to pre-processor 340.

Pre-processor 340 marks or instruments dynamic source code statements in the web page source code. This may be done by inserting a comment code line before each dynamic code line, and a comment code line after each dynamic code line. A comment code line may be formatted according to the rules of the web page source code language of template text within the web page source code. In the illustrated embodiment of the invention, the template text language is HTML. A legal HTML comment begins with "<!--", ends with "-->" and does not contain "--" or ">" in the comment.

A comment line inserted before a dynamic source code element may specify the line number and starting column position of the line of web page source code immediately prior to the dynamic code element. A comment line inserted after the dynamic code element may identify the line number and starting column position of the line of web page source code immediately following the dynamic code element.

After marking the dynamic source, pre-processor 340 deploys the instrumented web page source code to JSP container 375, which executes in application database server 370.

JSP container 375, based upon the template text and dynamic source code of the web page source code, executes dynamic code elements in the web page source code, replaces dynamic code scripting elements with corresponding generated content, and creates a dynamically generated web page. Template text may pass through JSP container 375 without modification.

The generated dynamic web page may include web page source code formatted according to the rules of the template text language (e.g., HTML), and may contain content or data retrieved by JSP container 375 from database 380. JSP container 375 forwards the generated page, including comment code lines, to HTML parser 345.

HTML parser 345 examines the dynamically generated web page source code created by JSP container 375, and may identify syntax errors or other types of problems in the dynamically generated source code. HTML parser 345 may also create or update a parse tree comprising an ordered hierarchical representation of the syntactic structure of the dynamically generated web page source code and/or content. Controller 330 may use the parse tree to facilitate updating or creating merged model 350.

In this embodiment of the invention, merged model 350 is an ordered hierarchical tree structure representing the dynamic web page, wherein each node of the tree structure corresponds to an HTML element, a piece of static content, a dynamic source code element, or a piece of dynamically generated content.

Controller 330 may order or mark nodes of merged model 350 to indicate a bi-directional association or link between a dynamic source code element and a corresponding piece of dynamically generated content.

In this embodiment of the invention, each dynamic source code element may be associated in the merged model with a separate piece of corresponding dynamically generated content. In another embodiment of the invention, each dynamic source code element may be associated with multiple pieces of dynamically generated content, or a single piece of dynamically generated content may be associated with multiple dynamic source code elements.

Controller 330 may determine an association between a dynamic source code element and its corresponding dynamically generated page content by identifying a pair of instrumentation comment lines previously inserted into the web page source code by pre-processor 340. The controller may then map the dynamically generated page content, located between the corresponding comment lines, back to the dynamic source code element referenced by the comment line pair.

In this embodiment of the invention, controller 330 may facilitate creating, ordering, and/or maintaining the merged model representation of the dynamic web page by examining or utilizing the parse trees built by JSP parser 335 and/or HTML parser 345.

Post-processor 355 may remove instrumentation marking comment lines or marks from the dynamically generated page, to facilitate the updating or creation of merged model 350.

Controller 330 updates source code editor view 360, and visual editor view 365, to reflect updated merged model 350.

FIG. 4A is a sample dynamic web page source code listing, which may be encountered in developing a dynamic web page in one embodiment of the invention.

Lines 401 and 403 of the sample web page source code listing comprise Java Server Page (JSP) elements. Line 401 comprises a JSP directive element defining the page content type as text/HTML, and line 403 comprises a JSP scripting element that, when executed by a JSP container, generates the current date. Line 403 also includes a standard HTML tag pair, <B> and </B>, for applying the 'bold' attribute to the current date when displayed in a browser or other similar viewer. The remaining lines of the web page source code comprise Hypertext Markup Language (HTML) template text.

The web page source code in FIG. 4A may be representative of source code component(s) encountered in the embodiment(s) of the invention illustrated in FIG. 2 or FIG. 3. The web page source code in FIG. 4A may also be representative of web page source code displayed in a source code editor view, in either of the same illustrated embodiments of the invention.

FIG. 4B depicts dynamically generated HTML web page source code. The illustrated web page source code may be representative of code dynamically generated by a JSP container in response to receiving the web page source code listing of FIG. 4A. For example, line 404 of FIG. 4B comprises dynamically generated content corresponding to dynamic source code line 403 in FIG. 4A.

The HTML web page source code in FIG. 4B may be representative of dynamically generated code produced by a JSP container component depicted in the embodiment of the invention illustrated in FIG. 2 or FIG. 3.

FIG. 4C depicts dynamically generated web page content rendered in a typical browser, in accordance with an embodiment of the invention. The content displayed in FIG. 4C may be representative of the dynamically generated HTML web page source code in FIG. 4B, displayed in a typical browser or other similar viewer.

The dynamically generated content displayed in FIG. 4C may be representative of web page content displayed in a visual code editor view depicted in the embodiment of the invention illustrated in FIG. 2 or FIG. 3.

Figure 4D:
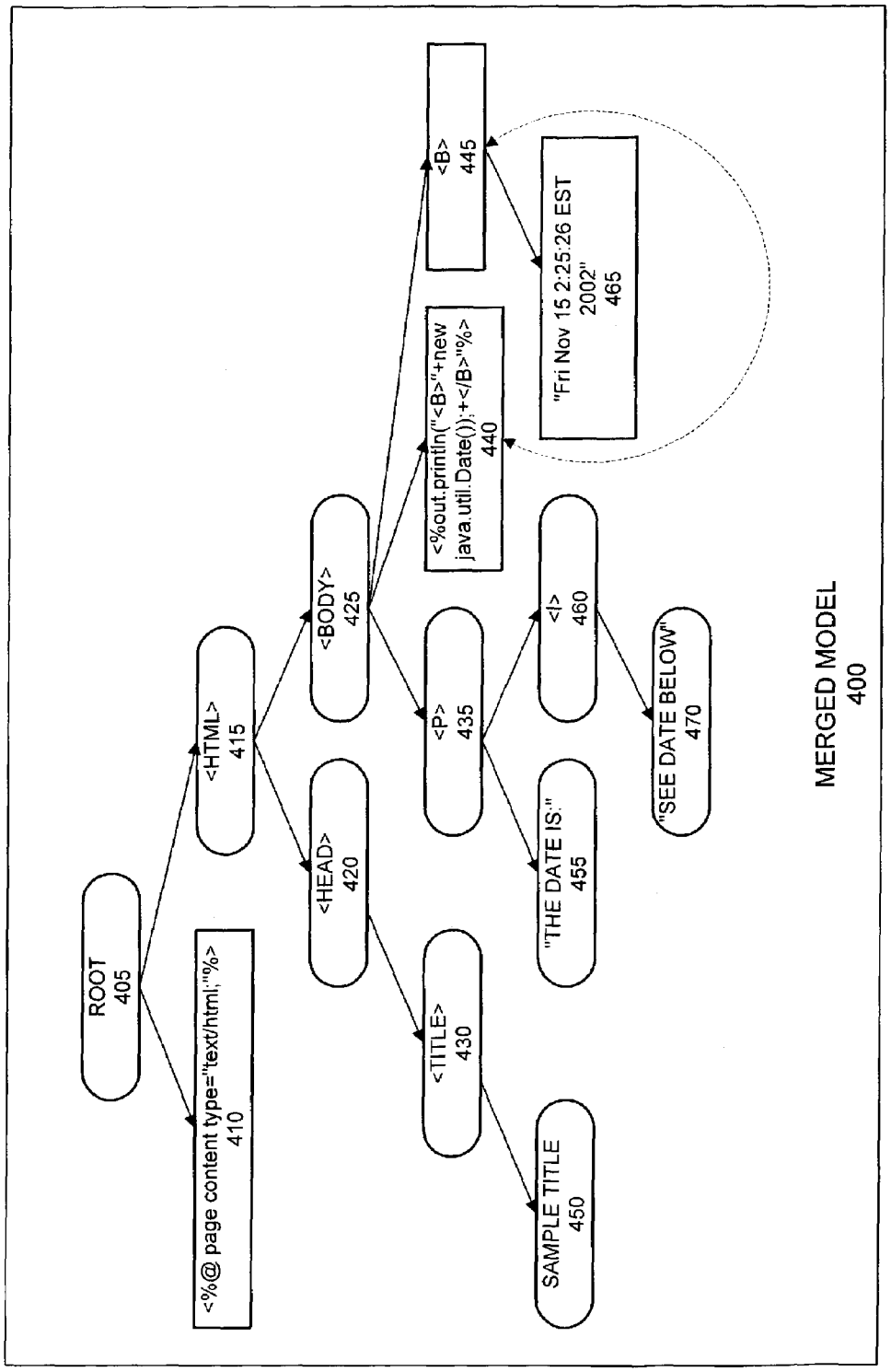
FIG. 4D depicts a merged model of a web page comprising dynamically generated content corresponding to FIGS. 4A-B, in accordance with an embodiment of the invention.

FIG. 4D depicts a merged model of a web page comprising dynamically generated content corresponding to the web page source code of FIGS. 4A-B, in accordance with an embodiment of the invention.

Merged model 400 comprises an ordered hierarchical tree representation of web page source code and web page content comprising a dynamic web page. The web page source code may comprise static source code (e.g. static HTML) and/or dynamic source code (e.g., JSP code elements). The web page content may comprise static content (e.g., static text within static HTML) and/or dynamically generated content (e.g., HTML generated by a server).

Merged model 400 comprises nodes 405 through 470. Node 405 is a root node, node 410 contains or represents a JSP directive element, node 440 contains a JSP scripting element, and node 465 contains a piece of dynamically generated content. The remaining nodes in merged model 400 contain or represent individual pieces of HTML template text corresponding to web page source code or dynamically generated content.

In this embodiment of the invention, merged model 400 indicates bi-directional associations or links between dynamic source code and corresponding dynamically generated content. For example, merged model 400 indicates and/or stores an association between node 440 and node 445. Node 440 contains a JSP scripting element for generating the current date, and node 445 is the top-most node of a sub-tree representing an HTML fragment containing the corresponding dynamically generated date.

Each node of merged model 400 may directly correspond to an individual HTML tag, static content element, JSP element, or dynamically generated content element of the dynamic web page.

The tree structure of merged model 400 may mirror the hierarchical structure of the web page source code and/or the dynamically generated web page code comprising the dynamic web page.

Illustratively, each node of merged model 400, except for root node 405 may correspond directly to a line of web page source code in FIG. 4B and/or the source code listing of FIG. 4A. For example, node 410 in merged model 400 corresponds to line 401 in FIG. 4A, and node 415 in merged model 400 corresponds to line 402 in FIG. 4A, and so on. Node 465 of merged model 400 corresponds to line 404 of FIG. 4B.

Additionally, merged model 400 may be representative of corresponding system component(s) of the embodiment(s) of the invention depicted in FIG. 2, FIG. 3 or FIG. 6 (described below).

Figure 5:
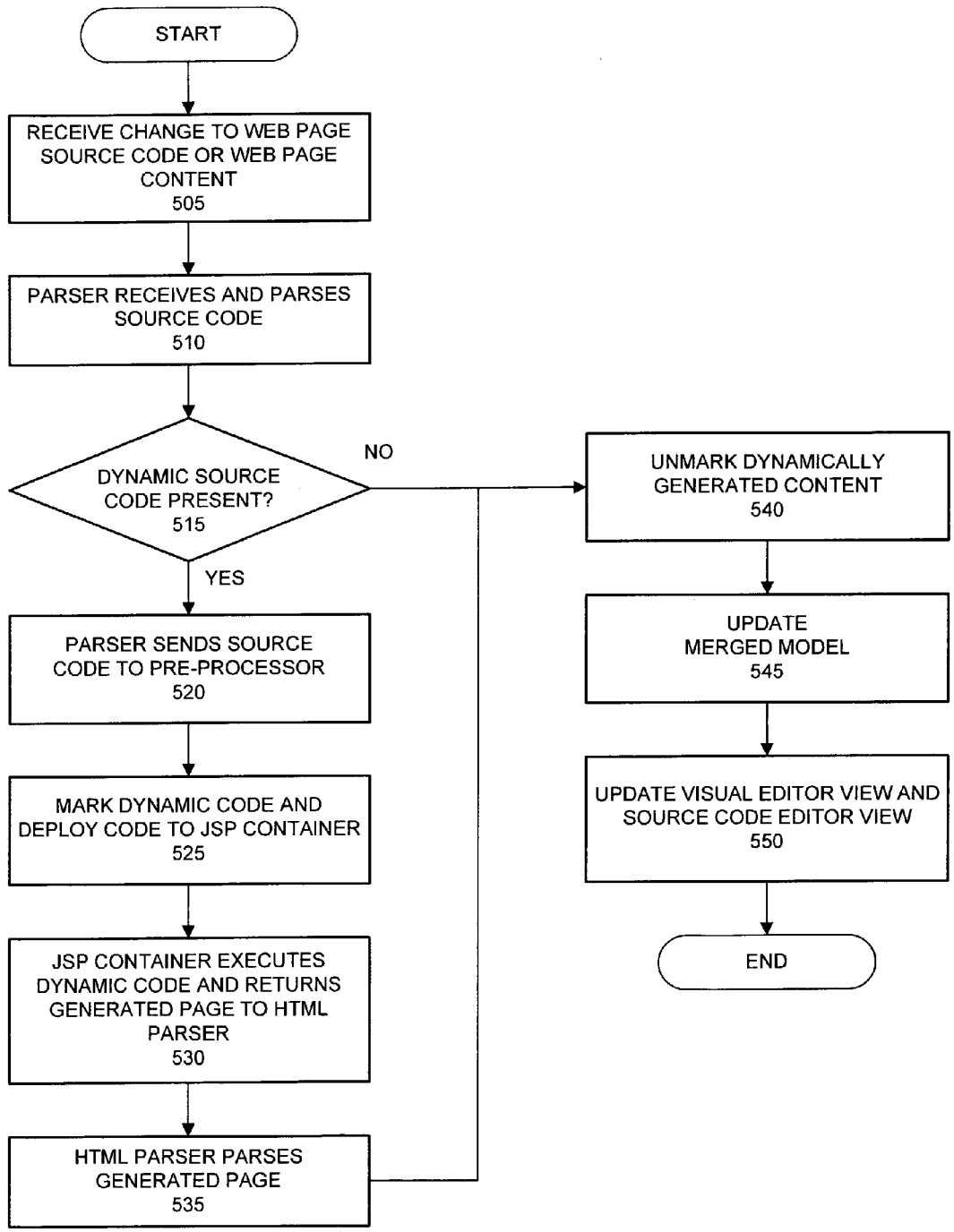
FIG. 5 is a flowchart illustrating one method of updating a merged model of a web page comprising dynamically generated content, in accordance with an embodiment of the invention.

FIG. 5 is a flowchart illustrating one method of updating a merged model of a web page comprising dynamically generated content, in accordance with an embodiment of the invention.

In state 505, a controller receives notification of a change to a dynamic web page from a visual editor view. The controller is configured to create and/or maintain a merged model representation of the dynamic web page, and to synchronize the merged model representation with the visual editor view and a source code editor view of the merged model. In this embodiment of the invention, the controller monitors each editor view for changes to the web page (e.g., by a page developer).

In the embodiment of FIG. 5, the visual editor view of the merged model may comprise a WYSIWYG type editor for creating, viewing and/or modifying web page content visually. The visual editor view may facilitate creation, modification or deletion of web page source code underlying corresponding web page content displayed in the visual editor view.

The source code editor view may comprise a text-based editor for modifying web page source code. Web page source code may include static source code, static content, and/or dynamic source code. In this embodiment of the invention, static source code includes Hypertext Markup Language (HTML), static content may include static text and/or headings, and dynamic source code includes Java Server Page (JSP) elements.

In state 510, a JSP parser component of the controller receives source code for the dynamic web page. The JSP parser examines the web page source code, and identifies dynamic source code statements within the source code. The JSP parser may create and/or update a source code parse tree, which the controller may use to facilitate updating or creating the merged model. Further, the JSP parser may identify syntax errors or other types of problems in the dynamic source code.

In state 515 the JSP parser determines if dynamic source code is included in the web page source code. If no dynamic source code is present, the JSP parser forwards the web page source code to the controller, and the method proceeds to state 540. If dynamic source code is present, the method proceeds to state 520.

In state 520, the JSP parser forwards the web page source code to a pre-processor for instrumentation.

In state 525, the pre-processor instruments or marks each dynamic JSP source code element in the web page source code. In this embodiment, the pre-processor inserts an HTML comment line immediately before each JSP code element line, and an HTML comment line immediately after each JSP code element line. After instrumentation, the pre-processor forwards the source code to a JSP container.

In state 530, the JSP container, which may execute in an application database server or other computer system, receives the marked web page source code. In this embodiment of the invention, the application database server also executes a database configured to return data or page content to the JSP container, in response to a request from the JSP container.

The JSP container may convert each JSP element in the source code into a Java servlet, and may compile the servlet before executing it and/or the JSP element. The JSP container, when executing one or more pieces of dynamic code, may replace a JSP element in the deployed source code with corresponding dynamically generated page content (e.g., HTML, static content). The dynamically generated page content may comprise data or content retrieved from the database. For JSP elements that do not generate content, the dynamically generated page content may comprise empty/void content or a null string. The JSP container then forwards the dynamically generated page to an HTML parser.

In state 535, the HTML parser examines the dynamically generated page. The HTML parser may create and/or update a parse tree used to facilitate updating or creating the merged model. Further, the HTML parser may identify syntax errors or other types of problems in the dynamically generated source code.

In state 540, a post-processor may remove instrumentation comment lines or marks from the dynamically generated page and/or one or more parse trees.

In state 545, the controller receives HTML web page source code and/or content, from the JSP parser, HTML parser and/or the post-processor. The controller then builds or updates the merged model representation of the dynamic web page. In this embodiment of the invention, the controller may parse, analyze, utilize, or merge web page source code or content contained in a parse tree (e.g., created by the JSP parser or the HTML parser) when creating or updating the merged model.

In state 550, the controller updates the visual editor view, and/or the source code editor view, to reflect the updated merged model. The illustrated method then ends.

Figure 6:
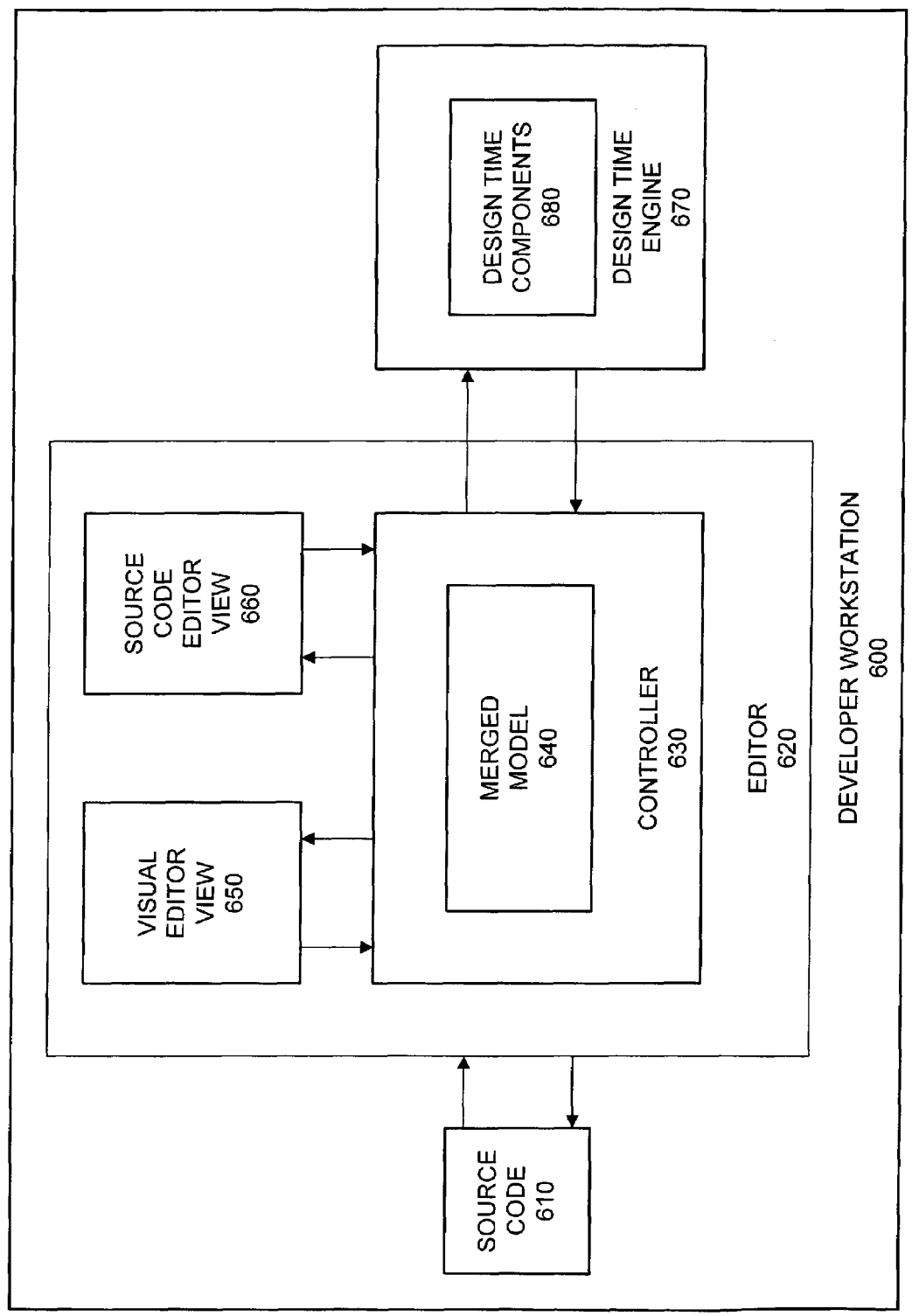
FIG. 6 depicts a system for facilitating development of a dynamic web page in a developer workstation, in accordance with an embodiment of the invention.

FIG. 6 depicts a system for facilitating development of a dynamic web page, in a developer workstation, in accordance with an embodiment of the invention. Such a system may allow a developer to develop a dynamic web page while a JSP container and/or an application database server is unavailable.

In this embodiment of the invention, the system comprises developer workstation 600, source code 610, editor 620, controller 630, merged model 640, visual editor view 650, source code editor view 660, design time engine 670, and design time components 680, wherein the workstation, source code, editor, controller, merged model, and editor views may be configured similarly and/or may operate similarly to corresponding system components of the embodiment of the invention depicted in FIG. 2.

Design time engine 670, executing in developer workstation 600, is configured to receive web page source code deployed by controller 630, and to return a representation of a dynamically generated web page to controller 630.

Design time components 680 may comprise icons, empty tables, placeholders or other page content elements representative of dynamically generated content that might be produced by a JSP container.

In this embodiment of the invention, information or characteristics related to placeholders or other representative items comprising design time components 680 may be determined from properties of custom tag libraries imported or entered into editor 620 and/or design time engine 670 by a page developer.

In response to receiving web page source code from controller 630, design time engine 670 may replace a dynamic source code element in the source code with an icon or other applicable placeholder element from design time components 680 before returning a dynamically generated web page to controller 630.

Similar to the embodiment depicted in FIG. 2, controller 630 updates merged model 640 to include any design time components returned from design time engine 670, and editor views 650 and 660 are refreshed to display the updated contents of merged model 640.

The foregoing descriptions of embodiments of the invention have been presented for purposes of illustration and description only. They are not intended to be exhaustive or to limit the invention to the forms disclosed. Accordingly, the above disclosure is not intended to limit the invention; the scope of the invention is defined by the appended claims.

What is claimed is:

1. A method of editing a dynamic web page, the method comprising:
   providing an interactive view of a dynamic web page comprising static source code and dynamic source code, wherein the static source code comprises instructions in a first programming language, wherein the dynamic source code comprises instructions in a second programming language, which is different from the first programming language;
   detecting a change to the dynamic web page, wherein the change comprises a modification to source code for the dynamic web page;
   parsing the source code, wherein said parsing comprises:
      identifying a changed dynamic source code element within the source code; and
      creating a source code parse tree corresponding to the source code; marking the changed dynamic source code element wherein said marking comprises:
         inserting a first comment line, including a reference to line and starting column numbers of the changed dynamic source code, into the source code before the changed dynamic source code element; and
         inserting a second comment line into the source code after the changed dynamic source code element;
   deploying the source code to a server, which generates dynamic content;
   receiving from the server the dynamic content corresponding to the changed dynamic source code element;
   parsing markup language representing the dynamic content to create a markup language parse tree;
   identifying a relationship between the corresponding dynamic content and the changed dynamic source code element;
   merging the source code parse tree and the markup language parse tree into a merged model representation of the dynamic web page, wherein said merged model indicates said relationship;
   refreshing the interactive view of the dynamic web page;
   receiving a change to the dynamically generated content, and
      updating the dynamic source code element indicated by said relationship in accordance with the change.

2. The method of claim 1, wherein the first comment line comprises an HTML code comment line.

3. The method of claim 1, wherein the interactive view comprises a WYSIWYG web page content editor.

4. The method of claim 1, wherein the interactive view comprises a text based web page source code editor.

5. The method of claim 1, wherein the source code comprises HTML code, Java Server Page (JSP) element code and static text.

6. The method of claim 1, wherein the changed dynamic source code element comprises a JSP element.

7. The method of claim 1, wherein the server comprises an application database server executing a JSP container and a database.

8. The method of claim 7, wherein the JSP container comprises a Java servlet configured to replace the changed dynamic source code element with dynamically generated HTML code.

9. The method of claim 8, wherein the dynamically generated HTML code comprises content retrieved from the database.

10. The method of claim 1, wherein said merged model representation of the dynamic web page comprises an ordered tree structure.

11. A computer readable storage medium storing instructions that, when executed by a computer, cause the computer to perform a method of editing a dynamic web page, wherein the computer readable storage medium can include volatile and non-volatile memory, but does not include carrier waves and transmission media, and wherein the method comprises:
   providing an interactive view of a dynamic web page comprising static source code and dynamic source code, wherein the static source code comprises instructions in a first programming language, wherein the dynamic source code comprises instructions in a second programming language, which is different from the first programming language;
   detecting a change to the dynamic web page, wherein the change comprises a modification to source code for the dynamic web page;
   parsing the source code, wherein said parsing comprises:
      identifying a changed dynamic source code element within the source code; and
      creating a source code parse tree corresponding to the source code; marking the changed dynamic source code element wherein said marking comprises:
         inserting a first comment line, including a reference to line and starting column numbers of the changed dynamic source code, into the source code before the changed dynamic source code element; and
         inserting a second comment line into the source code after the changed dynamic source code element;

deploying the source code to a server, which generates dynamic content;

receiving from the server the dynamic content corresponding to the changed dynamic source code element;

parsing markup language representing the dynamic content to create a markup language parse tree;

identifying a relationship between the corresponding dynamic content and the changed dynamic source code element;

merging the source code parse tree and the markup language parse tree into a merged model representation of the dynamic web page, wherein said merged model indicates said relationship; and refreshing the interactive view of the dynamic web page;

receiving a change to the dynamically generated content; and updating the dynamic source code element indicated by said relationship in accordance with the change.

12. The computer readable storage medium of claim 11, wherein the first comment line comprises an HTML code comment line.

13. The computer readable storage medium of claim 11, wherein the interactive view comprises a WYSIWYG web page content editor.

14. The computer readable storage medium of claim 11, wherein the interactive view comprises a text based web page source code editor.

15. The computer readable storage medium of claim 11, wherein the source code comprises HTML code, Java Server Page (JSP) element code and static text.

16. The computer readable storage medium of claim 11, wherein the changed, dynamic source code element comprises a JSP element.

17. The computer readable storage medium of claim 11, wherein the server comprises an application database server executing a JSP container and a database.

18. The computer readable storage medium of claim 17, wherein the JSP container comprises a Java servlet configured to replace the changed dynamic source code element with dynamically generated HTML code.

19. The computer readable storage medium of claim 18, wherein the dynamically generated HTML code comprises content retrieved from the database.

20. The computer readable storage medium of claim 11, wherein said merged model representation of the dynamic web page comprises an ordered tree structure.

\* \* \* \* \*